United States Patent [19]
Pike

[11] Patent Number: 5,935,883
[45] Date of Patent: *Aug. 10, 1999

[54] SUPERFINE MICROFIBER NONWOVEN WEB

[75] Inventor: Richard Daniel Pike, Norcross, Ga.

[73] Assignee: Kimberly-Clark Worldwide, Inc., Neenah, Wis.

[*] Notice: This patent is subject to a terminal disclaimer.

[21] Appl. No.: 08/959,115

[22] Filed: Oct. 23, 1997

Related U.S. Application Data

[63] Continuation of application No. 08/565,466, Nov. 30, 1995, abandoned.

[51] Int. Cl.$^6$ .................................................. D02G 3/00
[52] U.S. Cl. ......................... 442/340; 428/397; 442/362; 442/363; 442/414; 442/415
[58] Field of Search ............................ 428/397; 442/340, 442/362, 363, 414, 415

[56] References Cited

U.S. PATENT DOCUMENTS

| | | | |
|---|---|---|---|
| 4,298,649 | 11/1981 | Meitner | 428/198 |
| 4,460,649 | 7/1984 | Park et al. | 428/397 |
| 4,496,619 | 1/1985 | Okamoto | 428/397 |
| 4,497,868 | 2/1985 | Reinehr et al. | 428/397 |
| 4,557,972 | 12/1985 | Okamoto et al. | 428/397 |
| 4,724,184 | 2/1988 | Killian et al. | 428/397 |
| 4,923,454 | 5/1990 | Seymour et al. | 604/368 |
| 5,047,189 | 9/1991 | Lin | 264/103 |
| 5,059,482 | 10/1991 | Kawamoto et al. | 428/397 |
| 5,176,952 | 1/1993 | Joseph et al. | 428/297 |
| 5,238,733 | 8/1993 | Joseph et al. | 428/910 |
| 5,288,553 | 2/1994 | Collins et al. | 428/397 |
| 5,503,746 | 4/1996 | Gagnon | 210/490 |
| 5,573,668 | 11/1996 | Grosh et al. | 210/490 |
| 5,620,785 | 4/1997 | Watt et al. | 428/219 |
| 5,718,972 | 2/1998 | Murase et al. | 428/360 |
| 5,759,926 | 6/1998 | Pike et al. | 442/333 |
| 5,783,503 | 7/1998 | Gillespie et al. | 442/340 |

FOREIGN PATENT DOCUMENTS

| | | | |
|---|---|---|---|
| 0 754 796 A1 | 1/1997 | European Pat. Off. | D04H 13/00 |
| 3-213554 | 9/1991 | Japan | D04H 3/16 |
| 7-003595 | 1/1995 | Japan | D04H 1/42 |
| 96/41041 | 12/1996 | WIPO | D01D 5/30 |
| 98/03710 | 1/1998 | WIPO . | |
| 98/09010 | 3/1998 | WIPO . | |

*Primary Examiner*—Terrel Morris
*Attorney, Agent, or Firm*—Michael U. Lee; Douglas H. Tulley, Jr.

[57] ABSTRACT

The present invention provides a web containing superfine microfibers. The web contains a blend of a first group of split microfibers which contains a first polymer component and a second group of split microfibers which contains a second polymer component, wherein at least one of the polymer components is hydrophilic. The invention additionally provides a meltblown fiber web having at least two groups of fibers, wherein each group of the fibers has a distinct cross-sectional configuration.

17 Claims, 3 Drawing Sheets

SUPERFINE MICROFIBER NONWOVEN WEB

This application is a continuation of application Ser. No. 08/565,466 entitled "SUPERFINE MICROFIBER NONWOVEN WEB" and filed in the U.S. Patent and Trademark Office on Nov. 30, 1995 now abandoned. The entirety of this Application is hereby incorporated by reference.

BACKGROUND OF THE INVENTION

The present invention is related to a microfiber nonwoven web. More specifically, the invention is related to a web containing superfine microfibers.

Microfiber webs, such as meltblown fiber webs, are well known, and meltblown fiber webs are described in various patents and publications, including Naval Research Laboratory Report 4364, "Manufacture of Super-Fine Organic Fibers" by V. A. Wendt et al.; Naval Research Laboratory Report 5265, "An improved Device for the Formation of Super-Fine Organic fibers" by K. D. Lawrence et al.; and U.S. Pat. No. 3,849,241 to Butin et al. Meltblown fiber webs, which contain thermoplastic microfibers generally having less than 10 μm in average diameter, are produced by heating a polymer resin to form a melt, extruding the melt through die orifices in a die head to form filaments, directing a stream of heated fluid, usually air, toward the filaments exiting the die orifice to attenuated the filaments, and collecting the filaments on a foraminous surface to form a nonwoven web. Because the filaments are still tacky when they are collected, they form autogenous interfiber bonds to produce an integrated web.

Although conventional meltblown fiber webs contain fine microfibers, there is a need for fiber webs containing finer microfibers. There have been various attempts to reduce the diameter of meltblown fibers. One example of such attempts is reducing the polymer throughput to the die head. However, this direct controlling approach for producing fine meltblown fibers can only be used to reduce the fiber size to a limited extent since after a certain limit the reduction in through-put interrupts the fiber production altogether. Another exemplary process for producing fine meltblown fibers involves the steps of producing bicomponent conjugate meltblown fibers of an island-in-sea configuration and then dissolving the sea component of the meltblown fibers, thereby producing microfibers of the island component. However, the dissolving process is disadvantageous in that it requires a cumbersome dissolving step and it removes substantial portions of the conjugate fibers to produce fine fibers. Consequently, the dissolving process tends to be uneconomical and inefficiently utilizes the component polymers.

Yet another group of exemplary processes known in the art for producing fine fibers is split fiber production processes. However, known split fiber production processes may not be suitable for splitting meltblown fibers. The most widely used split fiber production process is a hydroneedling process, which utilizes a pressurized stream of water to split multicomponent conjugate fibers. In general, the process simultaneously splits and entangles the fibers to form a bonded nonwoven web. However, the hydroneedling process has not been used to produce split meltblown fiber webs since the autogenously bonded meltblown fiber webs, which have very fine breakable fibers and contain substantially uniformly distributed numerous interfiber bonds that restrict fiber movements, are difficult to split with the mechanical splitting process.

There are other fine microfiber webs known in the art, and they include glass microfiber webs. Although superfine glass microfibers can be produced, the glass microfibers are brittle and, thus, are not suitable for applications in which strength properties of the fibers are important.

There remains a need for superfine microfiber webs and a production process for producing the webs.

SUMMARY OF THE INVENTION

The present invention provides a web containing superfine microfibers. The web contains a blend of a first group of split microfibers which contains a first polymer component and a second group of split microfibers which contains a second polymer component, wherein at least one of the polymer components is hydrophilic. The invention additionally provides a meltblown fiber web having at least two groups of fibers, wherein each group of the fibers has a distinct cross-sectional configuration.

The invention also provides a splittable meltblown conjugate fiber containing at least two incompatible polymer components that are arranged in distinct segments across the cross-section of the fiber along the fiber length. The fiber can be characterized in that at least one of the polymer components is hydrophilic. In addition, at least one of the component polymers forms distinct unocclusive cross-sectional segments along the length of the fiber such that the segments are dissociable.

The superfine split microfiber web of the present invention exhibits, over conventional meltblown fiber webs, improved properties including improved fiber coverage, strength and textural properties, barrier properties, filtration properties and the like.

The term "steam" as used herein refers to both steam and a mixture of steam and air, unless otherwise indicated. The term "aqueous medium" as used herein indicates a liquid or gaseous medium that contains water or steam. The term "fibers" as used herein refers to both staple length fibers and continuous filaments, unless otherwise indicated. The term "multicomponent conjugate fiber" as used herein refers to a fiber which contains at least two component polymers that are arranged to occupy distinct segments of the cross-section of the fiber along the fiber length.

DETAILED DESCRIPTION OF THE INVENTION

Figure 1:
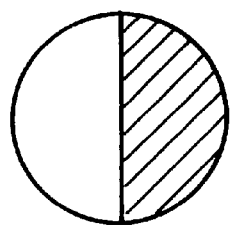
FIGS. 1–4 illustrate suitable conjugate fiber configurations for the present invention.

The present invention provides a superfine microfiber web, and the superfine microfibers of the web are produced by splitting splittable conjugate meltblown fibers. The superfine split microfiber web contains at least two groups of fibers, and the polymers forming the two fiber groups are incompatible. In addition, at least one of the incompatible component polymers is hydrophilic. The term "hydrophilic" as used herein indicates affinity for water. The hydrophilicity of the hydrophilic component polymer can be measured in accordance with the ASTM D724-89 contact angle testing procedure on a film produced by melt casting the polymer at the temperature of the die head that is used to produce the split microfiber web. Desirably, the hydrophilic polymer has an initial contact angle equal to or less than about 80°, more desirably equal to or less than about 75°, even more desirably equal to or less than about 60°, most desirably equal to or less than about 50°. The term "initial contact angle" as used herein indicates a contact angle measurement made within about 5 seconds of the application of water drops on a test film specimen. In accordance with the present invention, the hydrophilic polymer component can be a naturally hydrophilic polymer or a hydrophilically modified polymer.

The splittable conjugate meltblown fiber of the present invention spontaneously splits without extraneous mechanical agitation or fibrillation when the fiber is contacted with a hot aqueous split-inducing medium. Aqueous split-inducing media suitable for the invention include hot water, desirably hot water having a temperature of at least about 60° C., more desirably a temperature between about 65° C. and 100° C. Additionally suitable split-inducing media are steam and mixtures of steam and air that have a temperature higher than 60° C. but lower than the melting point of the lowest melting polymer of the conjugate fiber in order to prevent inadvertent melting of the polymer component during the fiber splitting process. Desirably, the air-steam mixture has between about 0% and about 75% of air and between about 100% and about 20% of steam. When an air-steam mixture medium is utilized, the temperature of the air, which is mixed with steam, can be adjusted to change the temperature of the split-inducing medium. For example, the temperature of the air can be elevated to further increase the temperature of the steam-air mixture.

In accordance with the invention, the conjugate microfibers split in a time frame equal to or less than about 30 seconds; desirably equal to or less than about 10 seconds; more desirably equal to or less than 5 seconds; most desirably less than equal to or less than 1 seconds, e.g., nearly instantaneous, when contacted with the split-inducing medium. In addition, at least about 25%, desirably at least about 50%, more desirably at least about 75%, most desirably at least about 95% and up to 100% of the conjugate meltblown fiber splits with the present fiber splitting process.

The superfine split microfiber production process is highly advantageous over prior art fine microfiber production processes. Unlike the prior art dissolving production processes, the present split microfiber production process is simple and spontaneous and does not create significant amounts of byproducts that may need to be disposed of. In addition, the present splitting process does not remove portions of the fibers. Consequently, the splitting process does not reduce the weight and fiber coverage of the fiber web. In fact, the present splitting process, which increases the number of fiber strands in the nonwoven web without reducing its basis weight, improves the fiber coverage and textural and physical properties of the web. Furthermore, the superfine microfiber webs produced from the present process provide highly desirable properties including strength properties and drapability over glass fiber webs containing comparably sized superfine glass microfibers.

As stated above, the superfine split microfiber webs of the invention are produced from multicomponent conjugate meltblown fibers having at least two incompatible polymers that are placed to occupy distinct segments across the cross-section along the entire or substantially entire length of each fiber. In accordance with the present invention, each segment of the conjugate fiber is occupied by a polymer that is incompatible with the polymer or polymers of the adjacent segment or segments. For example, two incompatible polymer compositions are alternatingly placed to form a unitary conjugate fiber or a number of mutually incompatible polymers are placed to form the conjugate fiber.

The conjugate fiber should have a cross-sectional configuration that is amenable to partial or complete dissociation. Accordingly, at least one dissociable segment of the cross-section of the conjugate fiber, which is occupied by one of the component polymers of the fiber, forms a portion of the peripheral surface of the fiber and has a configuration that is not occluded by the adjacent segments such that the dissociable segment is not physically impeded from being separated.

Figure 2:
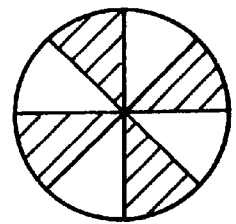
Figure 3:
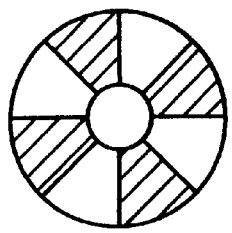
Figure 4:
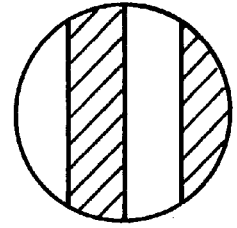
Figure 5:
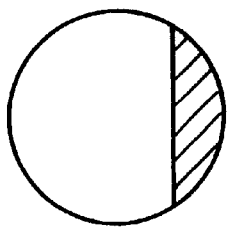
FIGS. 5–6 illustrate exemplary asymmetrical conjugate fiber configurations for the present invention.
Figure 6:
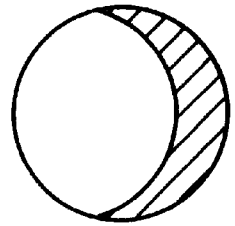

Suitable configurations for the conjugate fibers include side-by-side configurations (FIG. 1), wedge configurations (FIG. 2), hollow wedge configurations (FIG. 3) and sectional configurations (FIG. 4). It is to be noted that a suitable configuration does not need to have a symmetrical geometry provided that it is not occlusive or interlocking. Accordingly, suitable configurations also include asymmetrical configurations, for example, shown in FIGS. 5–6. Splittable conjugate fibers having an asymmetrical cross-sectional configuration, for example, FIG. 5 or FIG. 6, form a superfine microfiber web containing a mixture of at least two groups of fibers having different cross-sectional configurations, sizes or shapes. In addition, the splittable conjugate fibers need not be conventional round fibers. Other useful fiber shapes include rectangular, oval and multilobal shapes.

The different component polymers of the conjugate fiber need not be present in equal amounts. For example, a component polymer of the conjugate fiber may form a thin film-like section that merely acts as a divider between two adjacent component polymers, thus, providing a web that contains fine microfibers of mainly one polymer component.

Additionally, the splittable conjugate microfibers may be crimped or uncrimped. Crimped splittable microfibers of the present invention are highly useful for producing a lofty web since crimps increase the bulk or loft of the web.

In accordance with the invention, split microfibers having various thicknesses can be conveniently produced by adjusting the thickness of the conjugate fibers and/or adjusting the number of segments within the cross-section of the conjugate fibers. In general, a conjugate fiber having a finer thickness and/or a higher number of cross-sectional segments results in finer split microfibers. Correspondingly, the thickness of the split microfibers can be easily adjusted to have a wide variety of thicknesses. Of the suitable thickness controlling methods, the method of adjusting the number of cross-sectional segments is particularly desirable for the present invention. By adjusting the number of cross-sectional segments and the thickness of the conjugate microfibers, the split microfibers of the invention can even be produced having a thickness of about 0.2 $\mu$m or less.

As indicated above, hydrophilic polymers suitable for the present splittable conjugate fiber include both hydrophilic and hydrophilically modified polymers. Suitable hydrophilic polymers desirably have a contact angle less than equal to about 80°. Inherently hydrophilic polymers suitable for the present invention include thermoplastic polymers having the above-described hydrophilicity. Such polymers include copolymers of caprolactam and alkylene oxide diamine, e.g., Hydrofil®, which are commercially available from Allied-Signal Inc.; copolymers of poly(oxyethylene) and polyurethane, polyamide, polyester or polyurea, e.g., absorbent thermoplastic polymers disclosed in U.S. Pat. No. 4,767,825 to Pazos et al.; ethylene vinyl alcohol copolymers; and the like. U.S. Pat. No. 4,767,825 in its entirety is herein incorporated by reference.

Hydrophilically modifiable polymers suitable for the present invention include polyolefins, polyesters, polyamides, polycarbonates and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly (1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polybutylene terephthalate, polytetramethylene terephthalate, polycyclohexylene-1,4-dimethylene terephthalate, and isophthalate copolymers thereof, as well as blends thereof.

In accordance with the present invention, when a hydrophobic or less than sufficiently hydrophilic polymer is used as the hydrophilic component of the splittable conjugate fiber, the polymer must be hydrophilically or wettably modified. One useful means for modifying the polymer composition is adding a hydrophilic modifying agent or hydrophilic modifier. Suitable hydrophilic modifiers include various surfactants. Depending on the final use of materials containing the split microfibers, the surfactants can be fugitive or nonfugitive. Fugitive surfactants, i.e., surfactants that wash off from the fiber surface, are suitable if the split fibers are used in single exposure applications or applications in which nonwettable or hydrophobic properties are desired. When a fugitive surfatant is utilized, the split microfiber web can be subsequently washed such that the web and the split microfibers of the web become hydrophobic. Nonfugitive surfactants, i.e., surfactants that permanently or semipermanently adhere to the fiber surface, are suitable if the split fibers are used in applications in which more durably wettable or hydrophilic properties are desired. In addition, particularly suitable internally added surfactants are selected to have a low compatibility with the polymer of the hydrophilic component of the fiber since such surfactants readily migrate to the surface of the fiber during the fiber spinning process. When a surfactant having a slow migration characteristic is utilized, the fibers may need to be heat treated or annealed to facilitate the migration of the surfactant to the surface. Such heat treatment is known in the art as a "blooming" process. Illustrative examples of suitable surfactants include silicon based surfactants, e.g., polyalkylene-oxide modified polydimethyl siloxane; fluoroaliphatic surfactants, e.g., perfluoroalkyl polyalkylene oxides; and other surfactants, e.g., actylphenoxypolyethyoxy ethanol nonionic surfactants, alkylaryl polyether alcohols, and polyethylene oxides. Commercially available surfactants suitable for the present invention include various poly(ethylene oxide) based surfactants available under the tradename Triton, e.g., grade X-102, from Rohm and Haas Crop; various polyethylene glycol based surfactants available under the tradename Emerest, e.g., grades 2620 and 2650, from Emery Industries; various polyalkylene oxide modified polydimethylsiloxane based surfactants available under the tradename Masil, e.g., SF-19, which is available from Mazer; polyalkylene oxide fatty acid derivatives available under the tradename PEG, e.g. PEG 400, which is available from ICI; sorbitan monooleate, e.g., Span 80, which is available from ICI; ethoxylated hydroxylated castor oil, e.g., G1292, which is available from ICI; a mixture of sorbitan monooleate and ethoxylated hydroxylated castor oil, e.g., Ahcovel Base N62, which is available from ICI; polyoxyalkylene modified fluoroaliphatic surfactants which are available, e.g., from Minnesota Mining and Manufacturing Co.; and mixtures thereof.

The amount of surfactants required and the hydrophilicity of modified fibers for each application will vary depending on the type of surfactant and the type of polymer used. In general, fibers containing more hydrophilic or hydrophilically modified polymer or polymers result in more spontaneous splitting. Consequently, a high level of surfactant can be added to the polymer composition of the conjugate fibers provided that the surfactant level is not too high as to adversely affect the processability of the polymer composition. Typically, the amount of the surfactant suitable for the present fiber composition is in the range of from about 0.1% to about 5%, desirably from about 0.3% to about 4.5%, more desirably from about 0.5% to about 4%, by weight based on the weight of the polymer composition. The surfactant is thoroughly blended with the polymer composition before the composition is processed into fibers. For example, when a melt-extrusion process for producing fibers is utilized, the surfactant is blended and melt-extruded with the polymer compositions in extruders and then spun into fibers.

In accordance with the present invention, additional component polymers for the splittable conjugate fibers are selected from hydrophilic and hydrophobic thermoplastic polymers. Suitable polymers include the above-illustrated hydrophilic polymers and hydrophilically modifiable polymers. The additional component polymers do not have to hydrophilic, but need to be incompatible with the hydrophilic component polymer of the meltblown conjugate fibers.

The term "incompatible polymers" as used herein indicates the polymers that do not form a miscible blend when melt blended, i.e., immiscible. As a desirable embodiment of the present invention, differences in the polymer solubility parameter ($\delta$) are used to select suitably incompatible polymers. The polymer solubility parameters ($\delta$) of different polymers are well known in the art. A discussion of the solubility parameter is, for example, disclosed in *Polymer: Chemistry and Physics of Modern Materials*, pages 142–145, by JMG Cowie, International Textbook Co., Ltd., 1973. Desirably, the adjacently disposed component polymers of the present meltblown conjugate fiber have a difference in the solubility parameter of at least about 0.5 $(cal/cm^3)^{1/2}$, more desirably at least about 1 $(cal/cm^3)^{1/2}$, most desirably at least about 2 $(cal/cm^3)^{1/2}$. The upper limit of the solubility parameter difference is not critical for the present invention since the higher the difference, the more spontaneous the splitting of the fiber becomes.

Illustrative examples of particularly desirable pairs of incompatible polymers useful for the present conjugate microfibers include polyolefin-polyamide, e.g., polyethylene-nylon 6, polyethylene-nylon 6/6, polypropylene-nylon 6, polypropylene-nylon 6/6, polyethylene-a copolymer of caprolactam and alkylene oxide diamine, and polypropylene-a copolymer of caprolactam and alkylene oxide diamine; polyolefin-polyester, e.g., polyethylene—polyethylene terephthalate, polypropylene-polyethylene terephthalate, polyethylene-polybutylene terephthalate and polypropylene-polybutylene terephthalate; and polyamide-polyester, e.g., nylon 6-polyethylene terephthalate, nylon 6/6-polyethylene terephthalate, nylon 6-polybutylene terephthalate, nylon 6/6-polybutylene terephthalate, polyethylene terephthalate-a copolymer of caprolactam and alkylene oxide diamine, and polybutylene terephthalate-a copolymer of caprolactam and alkylene oxide diamine and polypropylene.

Figure 8:
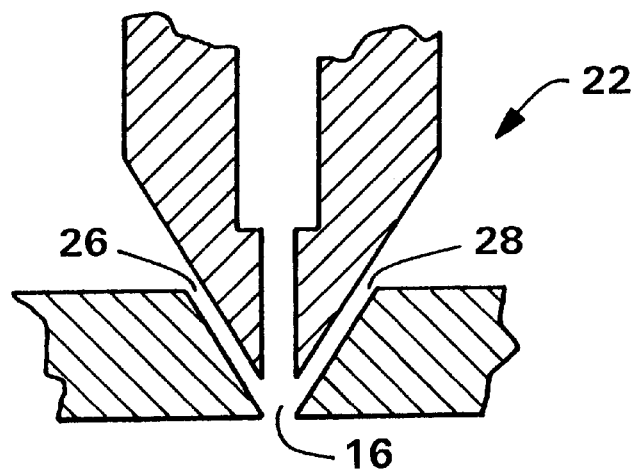
FIG. 8 illustrates an exemplary die head for producing meltblown fibers.
Figure 7:
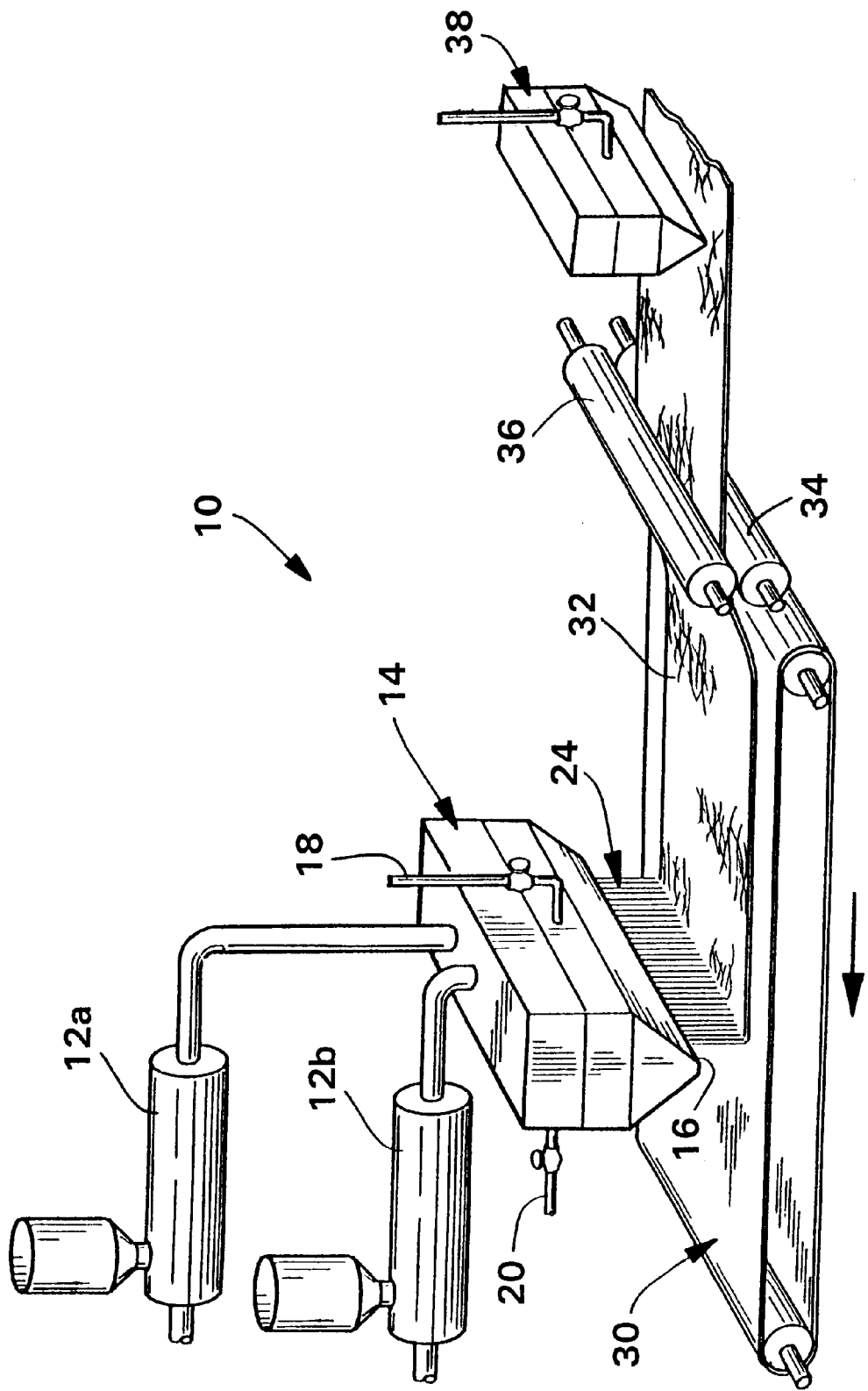
FIG. 7 illustrates an exemplary superfine split microfiber web production process for the invention.

FIG. 7 illustrates an exemplary process for producing a superfine split microfiber nonwoven web of the present invention. A process line 10 is arranged to produce a split meltblown fiber nonwoven web of two polymer components (bicomponent). It is to be noted that conjugate meltblown fibers containing more than two polymer components can be produced. The process line 10 includes a pair of extruders 12a and 12b for separately melt-processing two incompatible component polymers. One or both of the component polymers are hydrophilic polymers or hydrophobic polymers blended with effective amounts of a hydrophilic modifier in accordance with the present invention, and they are fed into respective extruders. Alternatively, the hydrophilic modifier can be injected into the respective extruders. The polymers are melt-processed in the extruders and then fed to, for example, a side-by-side die head 14. Generally described, the die head 14 includes a housing containing a plurality of plates stacked one on top of the other with a pattern of openings arranged to create flow paths for directing polymer extrudates through the die 14 into die tip openings or orifices 16. The die head tip 22 which is shown in cross-section in FIG. 8, contains die openings 16. Each of the openings 16 receives predetermined amounts of the two extrudates in a side-by-side configuration, forming a side-by-side filament 24. Hot high-pressure fluid, usually air, is supplied to the die tip via pipes 18 and 20 which terminate in channels 26 and 28 adjacent the die openings 16. As the extrudates exit the die openings 16 to form filaments 24, the high-pressure fluid attenuates and carries the filaments 24 onto a moving foraminous belt 30. Alternatively, the high-pressure fluid can be used to attenuate filaments and to break up the filaments to form air-borne fine discontinuous fibers. The attenuated filaments or fibers 24, which are not fully quenched and still tacky, are randomly deposited to form an autogenously bonded nonwoven web 32. A vacuum is drawn underneath the foraminous belt 30 to assist the web formation. Once the fibers are deposited and the web is formed, the web 32 is drawn from the belt 30 by rolls 34 and 36. The conjugate meltblown fiber web 32 is then passed under a spray apparatus 38 that thoroughly and evenly applies a hot aqueous split-inducing medium, e.g., steam or hot water, to split the fibers of the web. As an alternative embodiment, the web 32 can be passed though a hot water bath. A vacuum apparatus (not shown) can be placed on the other side of the web under the spray apparatus 38 to remove the applied split-inducing medium. The spilt fiber web is then dried.

The superfine split meltblown fiber web exhibits desirable properties, such as uniformity of the fabric, uniform fiber coverage, high barrier properties, high filtration properties and high fiber surface area. Webs containing the split microfibers that exhibit the above-illustrated desirable properties are highly suitable for various uses. For example, nonwoven webs containing the split microfibers are highly suitable for various uses including disposable articles, e.g., protective garments, sterilization wraps, wiper cloth and covers for absorbent articles.

As another embodiment of the present invention, the superfine microfiber web may be used as a laminate that contains at least one layer of the split microfiber web and at least one additional layer of another woven or nonwoven fabric or a film. The additional layer for the laminate is selected to impart additional and/or complementary properties, such as textural and strength properties. The layers of the laminate can be bonded to form a unitary structure by a bonding process known in the art to be suitable for laminate structures, such as a thermal, ultrasonic, adhesive, or hydroentangling process.

A laminate structure highly suitable for the present invention is disclosed in U.S. Pat. No. 4,041,203 to Brock et al., which is herein incorporated in its entirety by reference. In adapting the disclosure of U.S. Pat. No. 4,041,203, a pattern bonded laminate containing at least one layer of a continuous filament nonwoven web, e.g., spunbond fiber web, and at least one layer of the present superfine split microfiber nonwoven web can be produced, and such laminate combines the strength and textural properties of the spunbond web and the breathable barrier properties of the split microfiber web. The laminate structures are highly suitable for various uses including various skin-contacting applications, such as protective garments, covers for diapers, adult care products, training pants and sanitary napkins, various drapes, and the like.

Yet another embodiment of the present innovation, the superfine split microfiber webs of the present invention is highly suitable for various filter media in that the webs have superfine fibers and uniform fiber coverage and provide highly desirable filtration properties. An example of microfiber filter media concept that can be adapted to use the present superfine microfiber webs is disclosed, for example, in U.S. Pat. No. 4,824,451 to Vogt et al., which patent is herein incorporated by reference.

The following examples are provided for illustration purposes and the invention is not limited thereto.

EXAMPLES

Testing Procedures:

Frazier Permeability: The Frazier permeability, which expresses the permeability of a web in terms of cubic feet per minute of air per square foot of medium at a pressure drop of 0.5 inch of water, was determined utilizing a Frazier Air Permeability Tester available from the Frazier Precision Instrument Company and measured in accordance with Federal Test Method 5450, Standard No. 191A.

Contact Angle: The contact angle is an initial contact angle, i.e., measured within 5 seconds, that was measured on a 13 cm×13 cm cast film, which had a 3 mm thickness, with deionized water in accordance with ASTM D724-89.

Example 1

(Ex1)

A bicomponent meltblown fiber web was formed in accordance with the process described in U.S. Pat. No. 3,978,185 to Butin et al., except a side-by-side die head was used and two single screw extruders were used to process the two component polymers. The meltblown fibers of the web had 50 wt % of polypropylene and 50 wt % of nylon 6, based on the total weight of the fibers. The polypropylene was Himont's HH441, and the nylon 6 used was custom polymerized polycaprolactam, which was produced by Nyltech, Manchester, N.H., and had a formic acid relative viscosity of 1.85. The solubility parameter difference of the two polymers is larger than 5 $(cal/cm^3)^{1/2}$. The nylon component additionally contained 2 wt % of ethyoxylated polysiloxane, SF-19, which is available from Mazer. The polymer components were fed into the extruders and were processed to 455° F. (235° C.) extrudates. The extrudates were fed into the die and processed into a meltblown bicomponent fiber web. The meltblown web was removed from the forming surface and placed in boiling water for 5 seconds. The treated web was then dried, and the web studied under a microscope. In addition, the modified nylon component composition was tested for its hydrophilicity and had a contact angle of about 40°.

The observation under the microscope indicated that a large portion of the fibers of the meltblown fiber web was split during the water treatment.

Comparative Example 1

(C1)

Comparative Example 1 is the meltblown bicomponent fiber web of Example 1 before the web was treated in boiling water. The nonwoven web did not contain apparently visible split fibers.

The visual observation of the webs of Example 1 and Comparative Example 1 demonstrates that the conjugate microfibers containing a hydrophilic component polymer split when treated with a split-inducing medium of the present invention.

Example 2

(Ex2)

A meltblown bicomponent fiber web was produced in accordance with Example 1 except the nylon component contained 4 wt % of the ethoxylated polysiloxane. The contact angle of the modified nylon component was about 10°. The treated nonwoven web was tested for its permeability, and the result is shown in Table 1.

Comparative Example 2

(C2)

Comparative Example 2 is the meltblown bicomponent fiber web of Example 2 before the web was treated in boiling water. The permeability result is shown in Table 1.

TABLE 1

| Example | Frazier Permeability |
|---------|---------------------|
| Ex2     | 240                 |
| C2      | 312                 |

The significant decrease in permeability of Example 2 clearly demonstrates that the hydrophilically modified conjugate microfibers split to form a web containing increased number of fiber strands when treated with a hot aqueous fibrillation-inducing medium, thereby improving the barrier property of the web.

Figure 9:
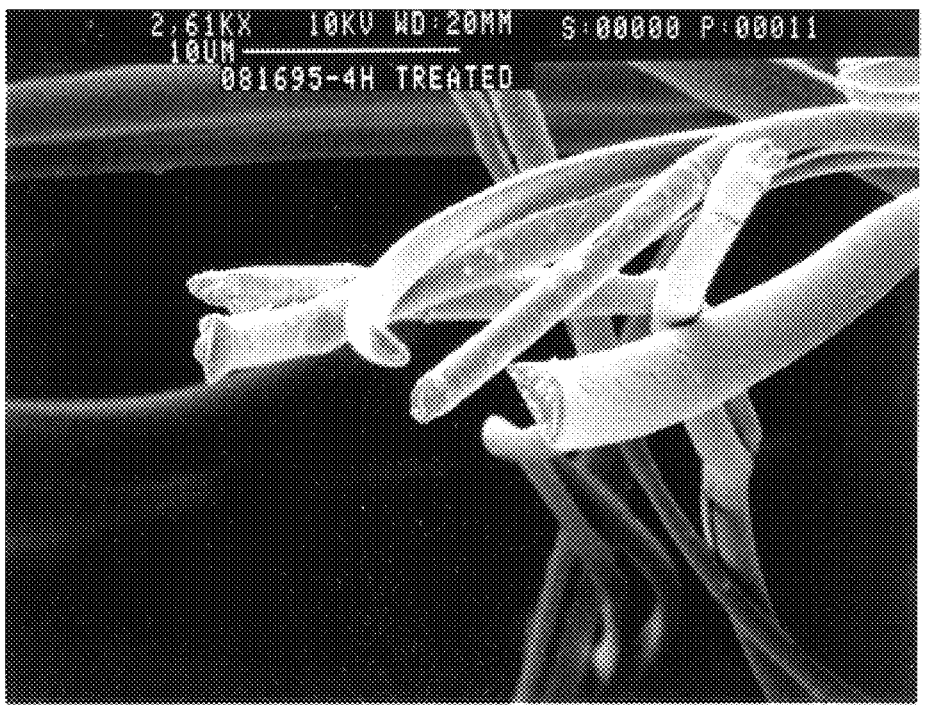
FIG. 9 is a microphotograph of a section of a split microfiber web of the present invention.
Figure 10:
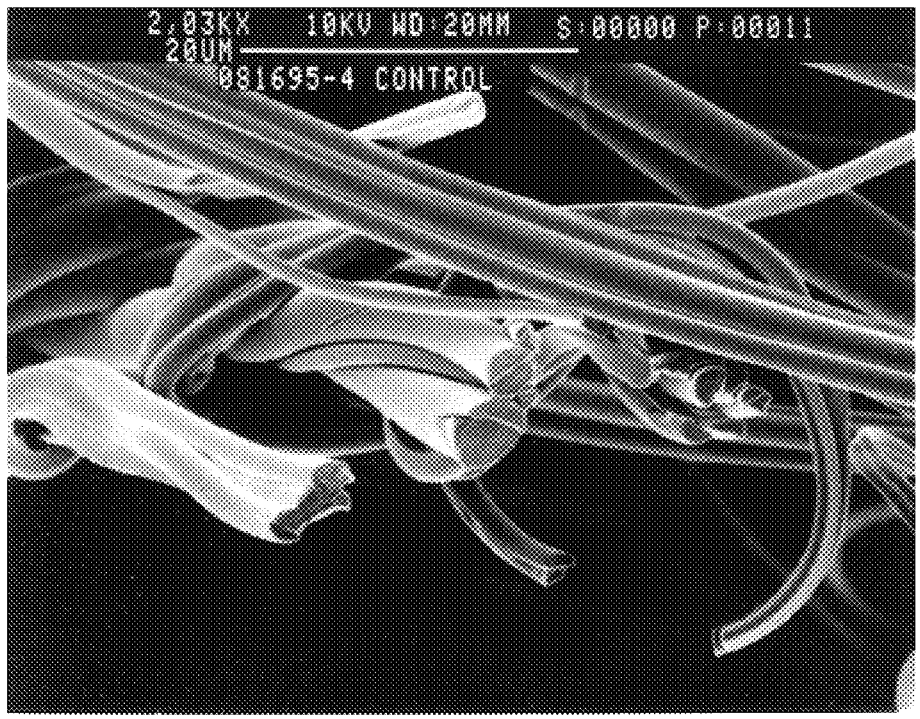
FIG. 10 is a microphotograph of a section of an untreated, unsplit microfiber web.

Turning to the figures, FIG. 9 is a scanning electron microphotograph of a representative section of the web of Example 2, and FIG. 10 is a scanning electron microphotograph of a representative section of the web of Comparative Example 2. FIG. 9 shows semicircular split fibers produced from round side-by-side meltblown fibers, whereas FIG. 10 shows unsplit bicomponent fibers of the web of Comparative Example 2.

As can be seen from the above examples, the present superfine split microfiber production process provides a spontaneously split superfine microfiber web. In addition, the superfine split microfiber web produced from the process provides a highly desirable combination of textural and physical properties, including desirable softness, uniform fiber coverage, desirable strength properties, drapability, high barrier properties, high filtration properties and the like.

What is claimed is:

1. A microfiber web comprising split fibers of meltblown fibers, said split fiber web comprising first fibers of a first polymeric composition and second fibers of a second polymeric composition wherein said first and second polymer compositions are incompatible with one another and further wherein said first polymeric composition is at least temporarily hydrophilic.

2. The microfiber web of claim 1 wherein said first fibers are hydrophilic.

3. The microfiber web of claim 2 wherein the first fiber polymeric composition is selected from the group consisting of (i) a hydrophobic thermoplastic polymer and a hydrophilic modifier and (ii) a hydrophilic polymer.

4. The microfiber web of claim 3 wherein said first fibers have an initial contact angle equal to or less than about 80° as measured in accordance with ASTM D724-89.

5. The microfiber web of claim 3 wherein said first polymeric composition comprises a hydrophobic thermoplastic polymer and a hydrophilic modifier and wherein said hydrophilic modifier is a surfactant and said first polymeric composition comprises between about 0.1% and 5%, based on the total weight of said component, of said surfactant.

6. The microfiber web of claim 5 wherein said surfactant is a fugitive surfactant.

7. The microfiber web of claim 1 wherein said first fibers are made hydrophobic by washing off a fugitive surfactant.

8. A filter medium comprising the superfine microfiber web of claim 2.

9. A disposable article comprising the superfine microfiber web of claim 2.

10. A microfiber web comprising a blend of a first group of split microfibers which comprise a first polymer and a second group of split microfibers which comprise a second polymer, wherein the first fibers are hydrophilic.

11. A microfiber web of claim 1 wherein said first and second fibers have a distinct cross-sectional configuration.

12. The meltblown fiber web of claim 11 wherein said split fibers have an average thickness of about 0.2 $\mu$m or less.

13. A process for producing split superfine meltblown fiber web, which process comprises:

a) providing a splittable meltblown fiber web, said fiber web comprising meltblown conjugate fibers, said meltblown conjugate fibers comprising a first polymer and a second polymer, wherein the first and second polymers occupy distinct segments across the cross-section and extending along the length of the fibers, said first polymer is incompatible with said second polymer and at least one of said first and second polymers is hydrophilic; and b) contacting said meltblown fiber web with a hot aqueous split-inducing medium to split said conjugate fibers of said web.

14. A microfiber web of claim 10 wherein the second group of fibers are hydrophilic.

15. A microfiber web of claim 2 wherein both the first and second fibers are hydrophilic.

16. A microfiber web of claim 1 wherein the first and second fibers have an average thickness of about 0.2 µm or less.

17. A microfiber web of claim 1 wherein said split fibers of the first and second polymer compositions are split from a common multicomponent fiber and further wherein said split fibers have a minimum dimension less than the diameter of said common multicomponent fiber.

* * * * *